United States Patent [19]
Ong

[11] Patent Number: 5,815,662
[45] Date of Patent: Sep. 29, 1998

[54] PREDICTIVE MEMORY CACHING FOR MEDIA-ON-DEMAND SYSTEMS

[76] Inventor: Lance Ong, 6 Post Rd., Monroe, N.Y. 10950

[21] Appl. No.: 698,099

[22] Filed: Aug. 15, 1996

Related U.S. Application Data

[60] Provisional application No. 60/002,351 Aug. 15, 1995.
[51] Int. Cl.$^6$ ............................................. H04N 9/79
[52] U.S. Cl. ........................ 395/200.47; 395/200.33; 395/200.32; 395/200.49; 348/7; 348/13; 365/230.01
[58] Field of Search ...................... 395/440, 200.33, 395/200.47, 200.32, 200.49, 200.57, 200.61, 200.68; 348/7, 13; 365/230.01

[56] References Cited

U.S. PATENT DOCUMENTS

| | | |
|---|---|---|
| 5,442,390 | 8/1995 | Hooper . |
| 5,453,779 | 9/1995 | Dan . |
| 5,461,415 | 10/1995 | Wolf . |
| 5,528,513 | 6/1996 | Vaitzblit . |
| 5,586,264 | 12/1996 | Belknap et al. .................... 395/200.49 |
| 5,611,049 | 3/1997 | Pitts ......................................... 395/608 |

*Primary Examiner*—Thomas Peeso
*Attorney, Agent, or Firm*—Leighton K. Chong

[57] ABSTRACT

A media-on-demand system employs predictive memory caching for a media server and associated data storage device to meet requests from multiple clients for media programs stored on the data storage device. The system allocates a plurality of sections of the server memory buffer to accomodate requests for popular titles. When requests for a title are received from a first grouping of clients, the server scheduler establishes a first streaming data process for the requested media program by reading in the data blocks for the program and retaining the data blocks in memory for use by another group of clients if requested close enough in time to the first grouping such that the first data block of the media program is still retained in memory. Used data blocks are removed if no requests by another group of clients are made within a given time and the memory is full or if the title is of a low priority level. The data blocks for the requested media program are accessed from data storage only once and retained in the server memory buffer until all groups in the time period have been serviced, thereby allowing multiple requests for popular titles during Prime Time to be handled with a minimum of accesses to the data storage device and with a minimum of server hardware requirements and costs.

6 Claims, 4 Drawing Sheets

PREDICTIVE MEMORY CACHING FOR MEDIA-ON-DEMAND SYSTEMS

This patent application claims the priority of my U.S. Provisional Application No. 60/002,351 filed on Aug. 15, 1995, entitled "Large Object Predictive Cache Engine".

FIELD OF THE INVENTION

This invention generally relates to a system and method for efficient scheduling of sending large amounts of data for multiple threads or processes across a high speed network, and, more particularly, to scheduling the sending of multiple continuous data streams during peak use of media-on-demand systems.

BACKGROUND OF THE INVENTION

Providers of interactive television and, more recently, of services on the Internet have been attempting to deliver multimedia and, more specifically, digital video services to a mass audience of subscribers. For example, the goal of media-on-demand services is to permit a viewer to select a movie, video, or audio program from a list of available titles for viewing on TV and to control the viewing of that program in a manner analogous to a VCR, with pause, rewind, fast forward and other viewing effects. Such media-on-demand services generally require a network system in which multimedia programs are stored as digital data on storage media for a media server and sent via network links to individual viewers upon request.

In a commercial media-on-demand system, such as currently offered video-on-demand services, there may be thousands of users in a given service area requesting access to the system at the same time, particularly in the time slot after dinner known as "prime time". Many of them may request access to the same titles which are current hits or new releases at the same time or within a short time of each other. To fill each request, the program must be delivered to the viewer as an uninterrupted stream of data. If VCR-like viewing functions are provided, the viewer may want to pause or accelerate the receipt of data.

A major bottleneck is the available bandwidth in accessing data storage media. The best currently available bus for disk storage media is the Wide SCSI-3 bus which has a maximum bandwidth of 40 megabytes per second (MB/s) in 32-bit mode. Each program of full-motion video can require a data stream to a single viewer of up to-1.2 MB/s. Thus, to support thousands of viewers during peak usage, conventional video-on-demand systems must employ multiple, high-speed processors and large arrays of disk storage media, which is very costly.

To reduce the cost and hardware requirements in video-on-demand systems, there have been various attempts to create efficient operations for a video server and data scheduling techniques to support the sending of multiple real-time continuous data streams and handling of interactive requests from the network. For example, in U.S. Pat. No. 5,528,513 to Vaitzblit et al., a video server schedules continuous data stream tasks as a highest priority followed by real-time and general purpose tasks using a weighted round-robin scheme. In U.S. Pat. No. 5,461,415 to Wolf et al., viewers requesting the same program are grouped together and sent data from a common data stream, and a look-ahead data stream is reserved in the event any viewer sends a pause request. In U.S. Pat. No. 5,453,779, transmission to a viewer sending a pause request is resumed from another on-going data stream if it will reach the pause point within a tolerable delay. In U.S. Pat. No. 5,442,390, the data stream for a selected program is sent to the viewer in segments, and each currently-viewed segment is stored in the viewer's console memory with pointers for handling VCR-like viewing functions.

Additionally, the most difficult condition to service with conventional hardware is when multiple requests for viewing of the same title is made within short times of each other, such as for popular titles during prime time. This creates a situation where multiple repetitive data accesses must be made over the program time duration to the same file on a data storage disk. Attempts to alleviate the resulting I/O congestion have included striping the same program data across multiple disks, or utilizing multiple copies of the same file, or making multiple copies of the file in expanded PAM buffers. Each of these methods requires redundant hardware to implement, thereby incurring added hardware costs.

Thus, the proposals to date have still not maximized the utilization of all available bandwidth in network server and storage I/O capacities such that a greatest number of viewer clients can receive continuous streaming media upon demand with a lowest amount of network hardware costs. It would therefore be highly desirable to have a software-controlled method that minimizes unnecessary repetitive accesses to data storage devices and manages peak-use data loadings by efficient data scheduling by the network server.

SUMMARY OF THE INVENTION

In accordance with the present invention, a method and system for predictive memory caching for a network server and associated data storage device to meet requests from multiple network clients for continuous streaming data from a large data file stored on the data storage device comprises the following steps:

(a) allocating a plurality of sections of a memory buffer of the network server for requests for a large data file, wherein each buffer section can store one of a series of data blocks of predetermined size into which the large data file is divided;

(b) upon receiving requests from one or more clients constituting a first group of network clients for the large data file within a first predetermined time interval $TI_1$, establishing a first streaming data process for sending the data blocks of the requested large data file to the first group of network clients by checking for or reading in a first data block of the requested large data file in the server's memory buffer and sending it to the first group of network clients;

(c) while sending a current data block to a current group of network clients, checking for or reading in a next data block of the large data file in the server's memory buffer;

(d) checking if requests for the same large data file has been made by another group of network clients close enough in time to the first time interval $TI_1$, that the first data block of the large data file remains in the memory, and establishing a streaming data process for such group and sending the first data block to such group;

(e) checking if the allocated sections of the memory buffer are full and, if so, removing the oldest-in-time, lowest priority data block to free a section of the memory buffer; and (f) performing steps (c) to (e) iteratively until all data blocks of the requested large data file have been sent to the groups for which the streaming data processes were established.

In my prefered system, the determination whether to retain or release a data block includes checking the large data file's priority level and retaining or releasing the memory buffer based upon that priority level;

Using this methodology, network clients requesting the same large data file within a short time of each other are grouped together in time intervals, and data blocks for the requested large data file are accessed from data storage only once and retained in the server memory buffer until all groups have been serviced. Thus, multiple requests for the same media program within a short time of each other, such as a popular title during Prime Time, can be handled with a minimum of accesses to the data storage device and with the minimum server hardware requirements and costs.

As a further feature of the invention, parallel streaming data processes can be established for other media programs, and the number and size of buffer sections, retention time period, and/or priority of service can be allocated on a predictive basis using a ranking of programs according to popularity, timing of release, request history, or other factors.

Other objects, features and advantages of the present invention are described in detail below in conjunction with the drawings, as follows:

DETAILED DESCRIPTION OF THE INVENTION

Figure 1:
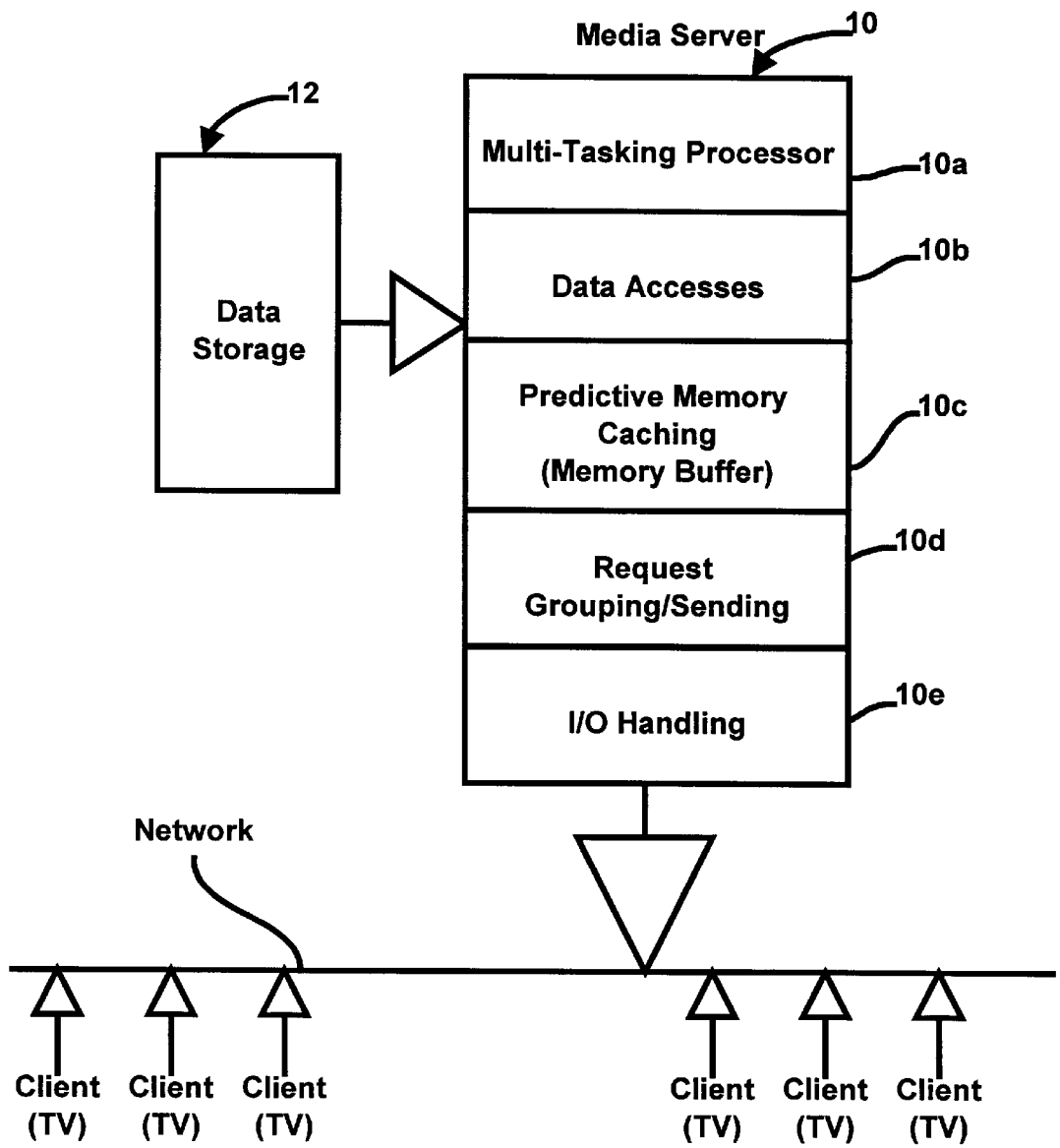
FIG. 1 is a schematic diagram of a media-on-demand system employing predictive memory caching in accordance with the invention.

FIG. 1 shows the general components of a media-on-demand system. A media server 10 is configured to handle requests for media programs from a plurality of clients in a given service area, such as TV viewers connected to a media services provider by a cable network. The server 10 has one or more multi-tasking processor(s) 10a for handling multiple requests to send media data for programs to clients. Server functions include data accesses 10b to an associated data storage device 12 for retrieving media data, a memory buffer 10c using predictive memory caching in accordance with the present invention, scheduling groups of viewers for sending requested media data 10d, and I/O functions 10e for media-on-demand operations on a network.

Figure 2:
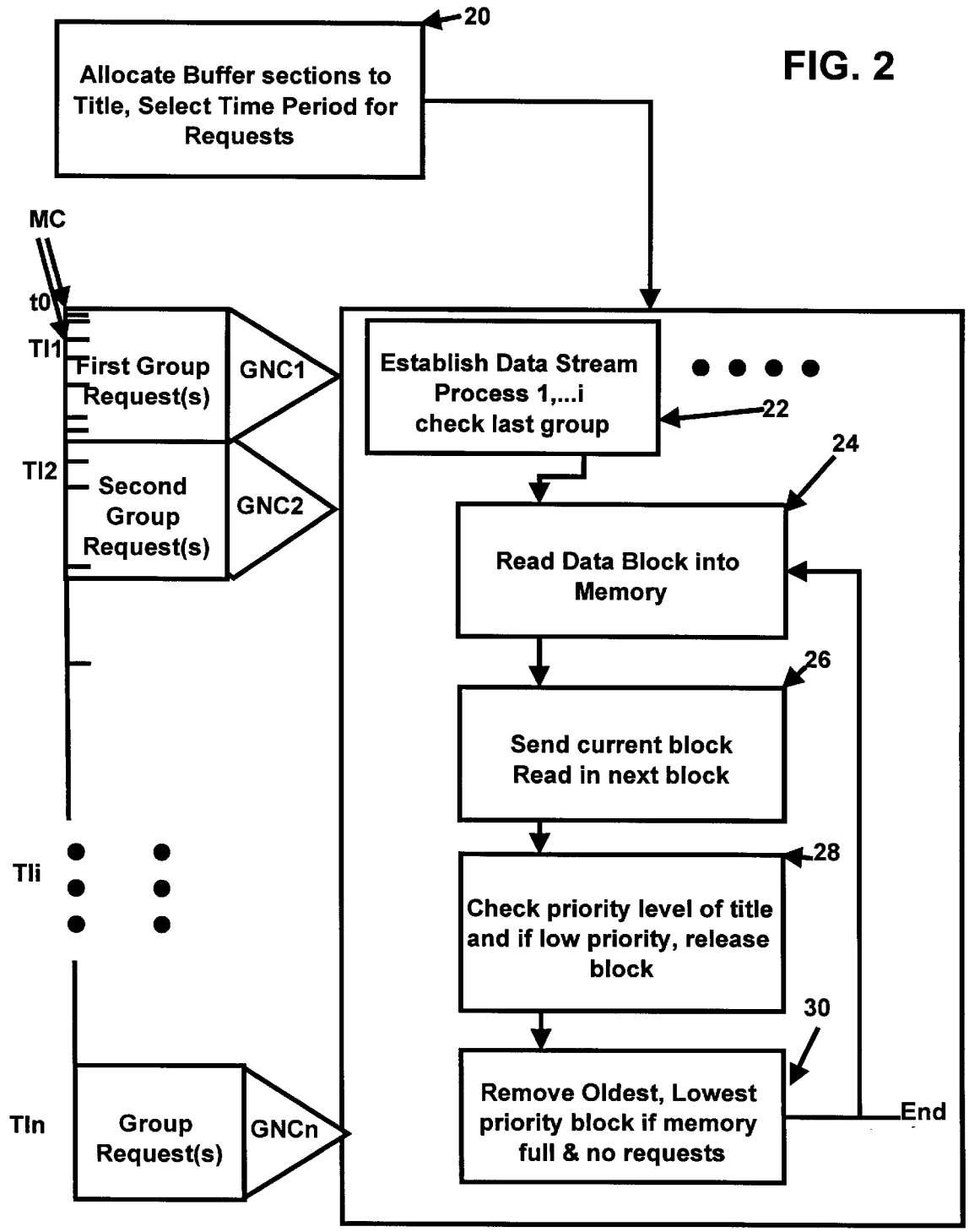
FIG. 2 is a schematic diagram of the memory caching system of the invention.

In FIG. 2, the basic methodology for maximizing utilization of the network server to handle multiple requests from clients is illustrated in block diagram form. At block 20, a predictive memory caching engine (to be described in greater detail below) is used to allocate sections of a memory buffer of the server 10 handling multiple requests for a large data file. The buffer sections are used to store in sequence the data blocks into which the large data file is divided.

Upon receiving requests from one or more clients for the large data file within a predetermined first time interval $TI_1$, the server groups the clients together in a first group of network clients $GNC_1$ and establishes a first streaming data process for sending the data blocks of the requested large data file to them (block 22). The streaming data process includes checking for or reading in the first data block $DB_1$ into the memory buffer (block 24), sending the current (first) data block while checking for or reading in the next data block of the large data file in the memory buffer (block 26). The client to make the first request at time $t_0$ is designated a Master Client MC.

While the first streaming data process is being executed, the server monitors whether further requests for the same large data file have been sent from clients grouped in another time interval $TI_i$ close enough in time to the first time interval $TI_1$ that the first data block of the large data file remains in the memory. If so, the server establishes a streaming data processes for that group and sends the first data block from memory.

As data blocks are transmitted from memory, a check is made as to the priority level of the large data file(block 28) and based upon the priority level, frees up or maintains that data block. A check is also made (block 30) to determine if the allocated sections of the memory buffer are full and, if so, removes the oldest-in-time, lowest priority data block to free a section of the memory buffer. The data blocks are transmitted in the streaming data process iteratively until all data blocks of the requested large data file have been sent to all of the groups of network clients.

Requests from clients for the same large data file sent after the first data block has already been removed from memory are handled by initiating a memory caching process for that large data file. Similarly, concurrrent requests for other large data files can be handled by setting up parallel memory caching processes.

An example of implementation of the above methodology of the present invention will now be described for video-on-demand services. In this implementation, the period of retention of data blocks in the server's memory buffer (RAM) is determined on a predictive basis using a ranking of video programs (Titles) according to popularity, such as "Top 10 Movies of the Week" maintained in a Statistical Table.

Figure 3:
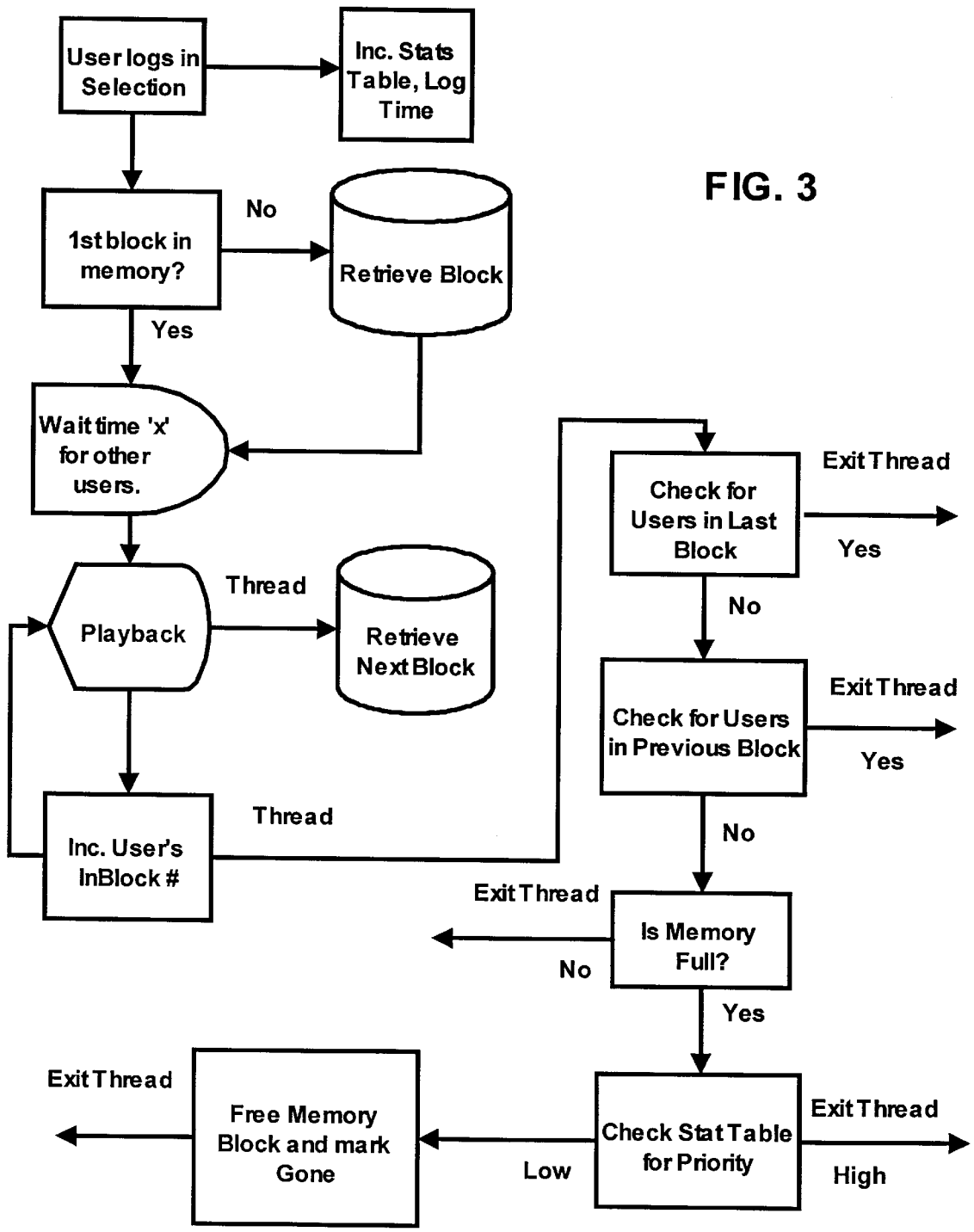
FIG. 3 is a flowchart of a specific implementation for the memory caching system.

In FIG. 3, a flow diagram illustrates the methodology of memory caching for a specific example. A viewer sends a request for a particular Title which is logged by the server's scheduler and noted on the Stats Table. The scheduler checks to see if the first data block for the requested Title is in memory. If not, it is retrieved from disk storage and read into the memory. If any other requests are received within a given waiting interval, the scheduler groups the new request with the pending one(s). After the given waiting time has elapsed from the first request, the scheduler begins transmission to a specific virtual address that is assigned to all the clients whose requests for the Title in play were grouped together.

As the scheduler services the group request, it first checks to see if the data is available from RAM and if it is, transmits. If not, the scheduler reads the data from the disk drives into RAM and then transmits. This is done iteratively until all blocks have been transmitted to the group of clients, with the user's block number being incremented and tracked each time. With each block, the scheduler checks in a separate thread for any users in other groups who will need the last and the previous blocks. If the memory is not full, then based upon the statistical priority list, it either leaves the used blocks in memory if a high priority, or immediately removes the blocks from memory if of a low priority. If the memory is full, the scheduler then checks again to see if the Title being serviced is in the "Top 10" of the Statistical Priority Table. If the Title is assigned a high priority, the last block is not unloaded and memory is checked for the lowest priority Title that has unused, yet still resident blocks of data. If it is assigned a low priority, the block is removed from memory.

By retaining the data blocks for high priority Titles in memory, most service requests will be handled from RAM, and disk drive access will be kept at a minimum. Since all transmissions are granularized, the available stream usage is kept to a minimum. The CPU also does not need to handle constant multi-channel disk I/O, and the required capacity of the CPU is kept at a minimum. This allows off-the-shelf commodity hardware such as Pentium CPUs to be used, thereby keeping cost to a minimum.

The server scheduler is configured to quantize all viewing requests for a specific Title to a common timebase and utilizes a single digital data stream to service all viewing requests that occur within the system configured timebase. This single stream could service one viewer or a thousand viewers simultaneously. This is accomplished through the granule addressing scheme whereby all clients within a particular granule (time interval) are mapped to a common group address which is used by the scheduler to transmit the Title to all clients assigned the common address. This granule address is assigned to a client when the request is acknowledged and certified. The first client who makes a particular Title request is designated as the Master Client for that Title and that particular granule, and the time of the first request is used for synchronizing the streaming data process with the server.

All data communications are conducted utilizing a synchronous buffering method which also insures a prioritized servicing of the client(s) making the requests. This method allows for requests to be ignored if higher priority requests must be serviced first. All service requests for a group are made via the Master Client. A group is allocated a selected pool of buffer sections, generally three or greater. Each buffer section holds the data for a designatable length of time. Playback begins at buffer section one. As soon as playback increments to buffer section two, the Master Client makes a service request to the server of a highest priority level. If the server is unable to service the requests such that a client must make a new request without the old request being serviced, the new request will be of a sufficiently higher priority level as to place it towards the front of the service request queue such that the server will service the request ahead of all lower priority requests. When the server does service the request, the server drops the client to a lower priority level in its subsequent service requests. Once serviced, the server deletes all requests for service by a particular granule, insuring that only one service request per granule will exist, thus maintaining synchronization.

A dynamic scheduler can be employed to fill the buffer sections based upon current viewer request patterns and to locate the points of least activity to fill the necessary buffers so that data requests will be serviced from RAM the greatest percentage of the time. As each client makes a service request, each request is placed into a queue which gets serviced by the server. How this queue shrinks and grows generates a statistical graph which the server uses to predict periods of minimum service requests. It is at these points that the server reads additional blocks of data into memory so that service requests can be handled from the memory buffers rather than directly from disk.

Maximum utilization of the available RAM buffers can be accomplished by planning data retention in the buffers based upon a statistical model developed through viewer patterns, rather than usage of the data storage device. Title usage characteristics differ greatly, but typically the usage profile of a popular Title is one where multiple clients request the same Title within a short time of each other. For example, this is exemplified by requests for a Current Release on a Friday or Saturday night during Prime Time (7:00 PM–11:00 PM).

To better manage the availability of RAM and hence provide better service to a greater number of customers, the system of the invention tracks Title usage across time and generates a statistical table (Stats Table) which represents a "Top 10" type of list. Based upon this Top 10 list, it can be projected that a #1 Title will have more requests for access during peak Prime Time hours then a #30 Title. Consequently, the server scheduler will attempt to keep blocks of a #1 Title in memory, whereas it will immediately release memory for the #30 Title.

An example of a Priority List is shown below to illustrate the ranking of multiple requests for popular titles during peak Prime Time hours.

| Priority List | | |
|---|---|---|
| Name | | Accesses |
| Forest Gump | | 2475 |
| User 24 | Blk. 45 | |
| User 28 | Blk. 32 | |
| True Lies | | 2315 |
| User 25 | Blk. 10 | |
| User 43 | Blk. 3 | |
| The Specialist | | 1948 |
| User 33 | Blk. 8 | |
| User 39 | Blk. 3 | |
| Stargate | | 1152 |
| User 10 | Blk. 152 | |
| User 12 | Blk. 152 | |
| User 20 | Blk. 136 | |
| User 47 | Blk. 2 | |
| Lion King | | 924 |
| User 7 | Blk. 275 | |
| User 9 | Blk. 271 | |

If a Title is highly popular and is likely to be requested by a large number of viewers at Prime Time, then the data blocks for that Title can be sized in large chunks, for example, 30 seconds of a video file (36 MB worst case) and retained in memory after the first request. This will give approximately a 30:1 time advantage, freeing up the disk drive array for the accessing of other files. While the current data block is being transmitted, the next block is loaded. In a system using a Wide SCSI-3 bus, with an I/O bandwidth of approximately 40 MB/s, each block would take about 8 seconds to transfer from disk to memory. The difference between run time and disk access time provides a relaxed window for the next block transfer and for increasing the server's capability to handle other files off the same data storage device.

Figure 4:
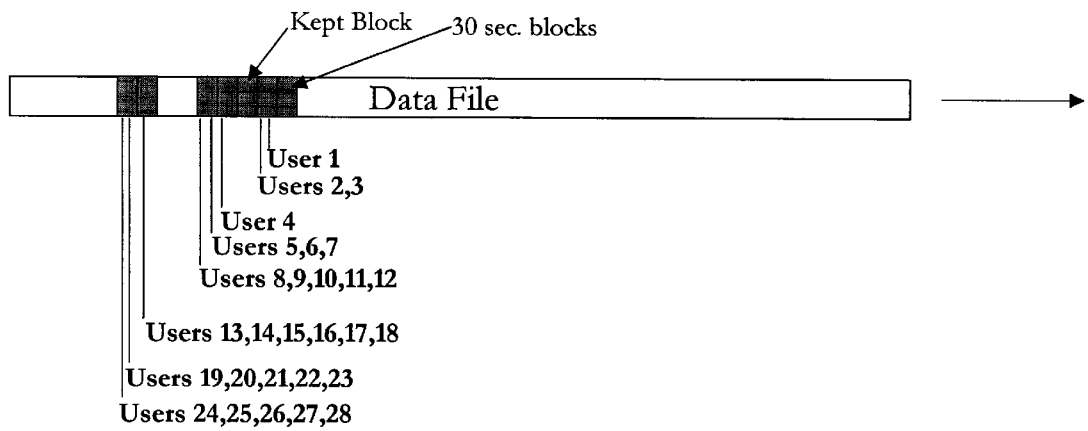
FIG. 4 is a diagram of a chart indexing multiple viewer use of data blocks of a media program in 30-second blocks.

Each new request for the Title can be used to initialize a user record and log the time indexing of that user in the file. Based upon the combined positioning of all users within the file, a chart that projects the swapping of data blocks in and out of memory can be built. An example of such a chart is shown in FIG. 4. The chart can be used to project when a current block will be used again by another user (group of users).

Figure 5:
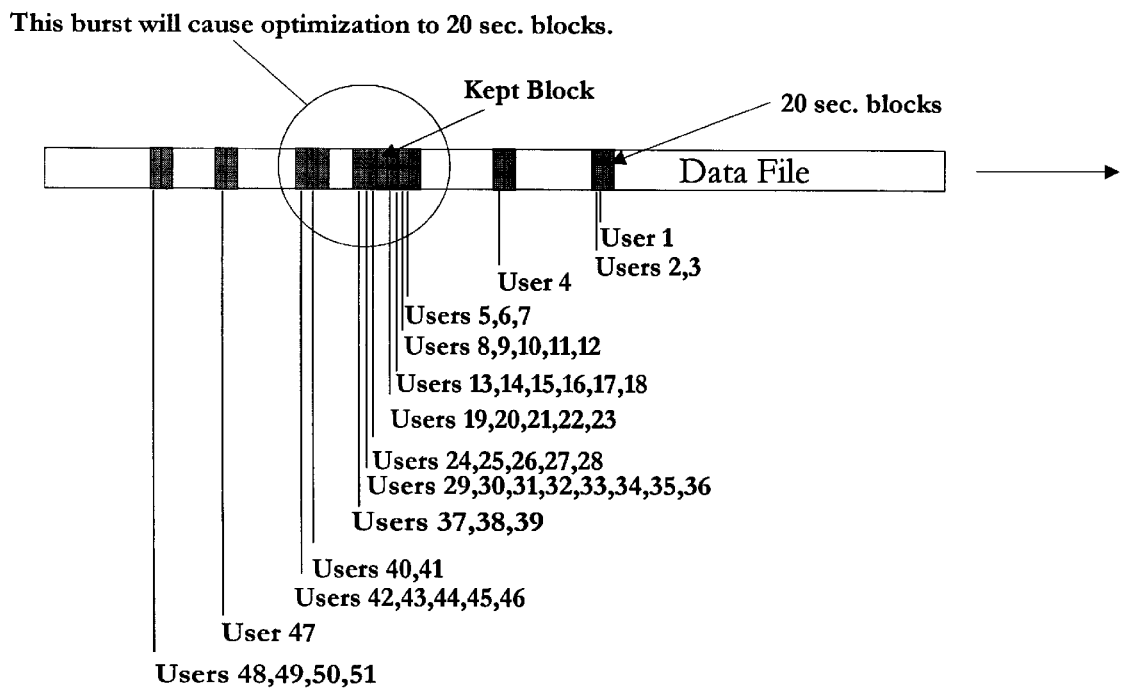
FIG. 5 is a diagram of a chart indexing multiple viewer use in 20-second blocks for comparison.

This chart can be built on a dynamic basis during a day or peak period of a day. Analysis of the chart can allow the optimum size of the data blocks in memory to be determined. For example, at certain times during peak hours, a 30-second data block may not be the optimum size for memory utilization. It may be calculated that smaller 20–15-second blocks would work better based on the usage chart for that particular file. In FIG. 5, an example of a chart for 20-second blocks is shown for the user time indexing in FIG. 4.

The result is that more users can simultaneously access the same file from the server memory rather than through disk access, thereby making the system more efficient. Without the predictive memory caching, multiples files would have to reside on multiple drives in the system, and access and throughput would have to be distributed over more hardware components.

Use or predictive memory caching during Prime Time conditions can substantially reduce data traffic loadings on system drives. It is found to be possible to achieve a 20/80 drive/network ratio or better of data output to handle client requests using this technology. Optimization of the scheduler and predictive caching engine could achieve a 5/95 drive/network ratio with the bulk of the output being Multicast for minimal number of servers utilized. This could be the case, for example, on a Friday night, at 8 PM, on the first or second night release of a major film such as Braveheart.

At worst case, each client may want to watch a different Title at the same time. If this occurs, the server will need to have enough RAM to buffer 2 times the amount of memory needed per granule timebase. This means that, for example, if the video compression methodology is MPEG-2 at 4 Megabits per Second (Mb/s) and if the timebase is 5 seconds, each granule needs 2.5 Megabytes(MB) of RAM. In the preferred embodiment, the network I/O channel has a throughput of 1 Gb/s which means that approximately 200 streams can be serviced simultaneously, taking into account network overhead. This also means that 1 GB total is necessary for buffering of all the individual streams. Since a Pentium processor is technically capable of addressing 4 GB of memory and is manufactured in some server configurations with 1 GB addressing capability, this does not present a problem. Newer Pentium Pro servers have up to 2 GB of RAM available and a bus capacity of up to 264 MB/s throughput.

The preferred hardware configuration is a Pentium Pro machine with 2 GB of memory. Disk Storage is a multi-gigabyte RAID array connected via a Fibre Channel 1 Gb/s interface to the server. The network is also a fiber network connected to a fiber switcher for distribution via fiber optic cable to sub network nodes of 200 to 1000 homes. At the node, a router converts the fiber network to multi-channel 10 Mb/s Ethernet links for distribution to the homes via a cable modem in the case of a Cable MSO (Multiple Service Operator) or ADSL in the case of a Telco. The system is entirely scalable based upon how many homes must be serviced. A Fibre Channel is capable of supporting 128 devices (disks and servers) in an arbitrated loop and 16 Million in a switched fabric.

To facilitate the coordination of all the servers, there is a server manager which is a computer that receives commands from clients and controls the operations of each server, assigning each their clients and granule addresses that they will service. The server manager also validates client requests for billing and security before passing the task on to the server.

TV viewing functions, such as Stop, Pause, Rewind, Fast Forward, etc., may also be implemented for the video-on-demand services using known techniques such as those disclosed in the patents previously mentioned in the Background. To accomodate such TV viewing functions in the Granule Addressing scheme, if a Master Client issues a Stop, Pause, or any other motion command, the next viewer in time within that particular Granule is promoted to the status of Master Client. The viewer issuing a motion command is removed from the client list and subsequently is unmapped from the Granule Address. If the viewer resumes Play, the server checks to see if there is a granule currently at or about to arrive at that index point, whereupon the client is assigned to that granule. If nothing is available, a new granule is started.

Besides media-on-demand, the principles of the present invention may be broadly applied to any type of application for a network server system where repetitive requests from clients are made for the same large data files stored on the associated data storage device, and, particularly, where efficient scheduling of repetitive continuous data streams are required.

Although the invention has been described with reference to a preferred embodiment, it will be appreciated that other variations and modifications may be devised in accordance with the principles disclosed herein. The invention, including the described embodiment and all variations and modifications thereof within the scope and spirit thereof, is defined in the following claims.

I claim:

1. A system for predictive memory caching for a media-on-demand network connected to a plurality of clients, comprising:

(a) a network server for handling requests from multiple clients for streaming media data for media programs provided by said system, said server being provided with a memory buffer;

(b) a data storage device associated with said network server for storing media data for media programs provided by said system;

(c) a server scheduler for allocating a plurality of sections of the memory buffer for requests for a given media program, wherein each buffer section can store one of a series of data blocks of predetermined size into which the media program is divided;

(d) said server scheduler having first process program means which, upon receiving requests from one or more clients constituting a first group of network clients for the media program within a first predetermined time interval $TI_1$, establishes a first streaming data process for sending the data blocks of the requested media program to the first group of clients, including process program means for checking for and, otherwise, for reading in a first data block of the requested media program from the data storage device in the server's memory buffer and for sending it to the first group of clients;

(e) said server scheduler having second process program means for sending a current data block to a current group of clients, and for checking for and, otherwise, for reading in a next data block of the media program in the server's memory buffer;

(f) said server scheduler having third process program means for checking if requests for the same media program have been made by another group of clients close enough in time to the first time interval $TI_1$ that the first data block of the large data file remains in memory, and for establishing a streaming data process for such group and sending the first data block to such group;

(g) said server scheduler having fourth process program means for checking if the allocated sections of the memory buffer are full and, if so, for removing an oldest-in-time, lowest priority data block to free a section of the memory buffer;

wherein the operations of said second, third, and fourth process program means are performed iteratively until all data blocks of the requested large data file have been sent to the groups of clients for which the streaming data processes were established; and wherein said network server employs a microprocessor having a capacity for addressing up to 4 gigabytes of random access memory for the memory buffer which is capable of handling multiple accesses by a multiplicity of clients for "Top 10" video-on-demand service during Prime Time hours.

2. A system for predictive memory caching for a media-on-demand network connected to a plurality of clients, comprising:

(a) a network server for handling requests from multiple clients for streaming media data for media programs provided by said system, said server being provided with a memory buffer;

(b) a data storage device associated with said network server for storing media data for media programs provided by said system;

(c) a server scheduler for allocating a plurality of sections of the memory buffer for requests for a given media program, wherein each buffer section can store one of a series of data blocks of predetermined size into which the media program is divided;

(d) said server scheduler having first process program means which, upon receiving requests from one or more clients constituting a first group of network clients for the media program within a first predetermined time interval $TI_1$, establishes a first streaming data process for sending the data blocks of the requested media program to the first group of clients, including process program means for checking for and, otherwise, for reading in a first data block of the requested media program from the data storage device in the server's memory buffer and for sending it to the first group of clients;

(e) said server scheduler having second process program means for sending a current data block to a current group of clients, and for checking for and, otherwise, for reading in a next data block of the media program in the server's memory buffer;

(f) said server scheduler having third process program means for checking if requests for the same media program have been made by another group of clients close enough in time to the first time interval $TI_1$ that the first data block of the large data file remains in memory, and for establishing a streaming data process for such group and sending the first data block to such group;

(g) said server scheduler having fourth process program means for checking if the allocated sections of the memory buffer are full and, if so, for removing an oldest-in-time, lowest priority data block to free a section of the memory buffer;

wherein the operations of said second, third, and fourth process program means are performed iteratively until all data blocks of the requested large data file have been sent to the groups of clients for which the streaming data processes were established;

wherein large data files that are requested repeatedly are assigned a priority ranking, and said server scheduler includes a fifth process program means for making a determination whether to retain or release a data block from the memory buffer based upon the priority ranking; and wherein said server scheduler employs a statistics list which logs the time and media program requested by each client and is used to generate the priority ranking.

3. A system according to claim 2, wherein said server scheduler's fourth process program means is operated to determine whether to retain or release a data block from the memory buffer based upon checking for a predetermined number of groups of network clients following the first time interval $TI_1$ at which the large data file was requested.

4. A system according to claim 2, wherein in said server scheduler the memory buffer sections are allocated in number and size by means for predicting an optimal utilization of the memory buffer.

5. A system according to claim 4, wherein said means for predicting optimal utilization of the memory buffer includes said server scheduler's fifth process program means being operated for ranking the large data files in priority according to one or both of (a) the number of client requests within a given time period and (b) external client preference data.

6. A system according to claim 2, wherein said server scheduler is operated to determine whether to retain or release a data block from the memory buffer based upon establishment of another group of network clients within a predetermined time period following the first time interval $TI_1$ at which the large data file was requested.

* * * * *